(No Model.)
A. HERRLING.
MEANS FOR SOUNDING COMBS.
No. 572,055. Patented Nov. 24, 1896.
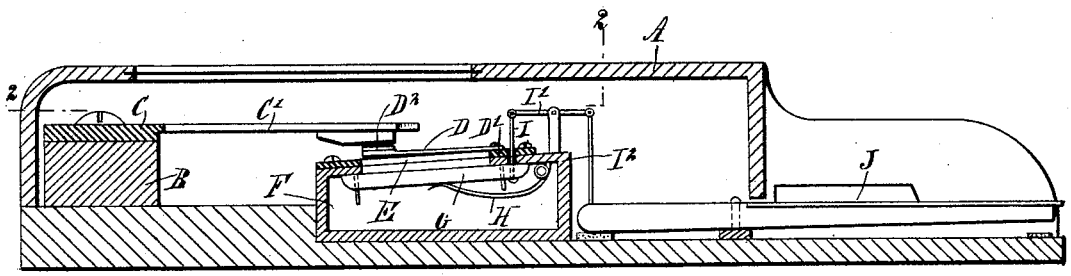
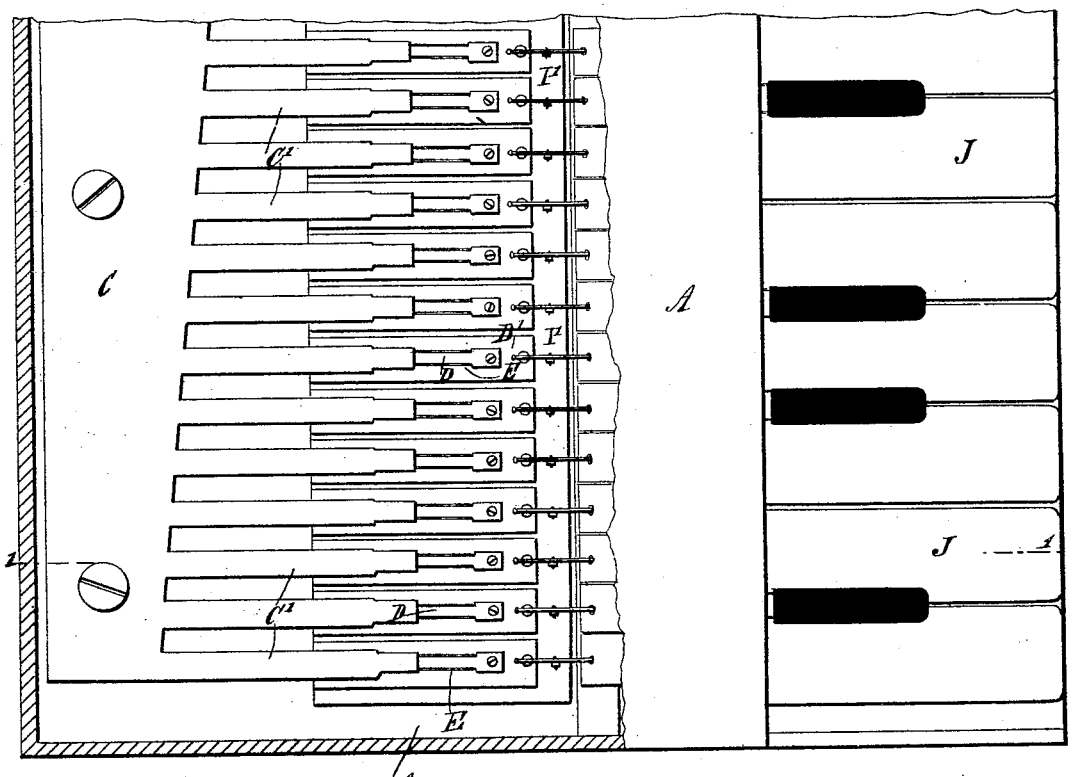
WITNESSES
H. Walker
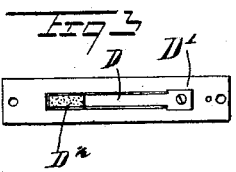
INVENTOR
A. Herrling
BY
ATTORNEYS.

UNITED STATES PATENT OFFICE.

ALFRED HERRLING, OF JERSEY CITY, NEW JERSEY.

MEANS FOR SOUNDING COMBS.

SPECIFICATION forming part of Letters Patent No. 572,055, dated November 24, 1896.

Application filed April 24, 1896. Serial No. 588,914. (No model.)

*To all whom it may concern:*

Be it known that I, ALFRED HERRLING, a subject of the Emperor of Germany, at present residing in Jersey City, in the county of Hudson and State of New Jersey, have invented a new and Improved Means for Sounding Combs, of which the following is a full, clear, and exact description.

The invention relates to musical instruments using combs for producing the desired tones; and the object of the invention is to provide a new and improved means for sounding the teeth of the combs to produce soft and melodious tones and completely obviate the harsh metallic sounds caused by picking the combs, as heretofore practiced.

The invention consists of certain novel features of construction in a musical instrument of the above-indicated class, all as hereinafter described and claimed.

Figure 1 is a sectional side elevation of the improvement on the line 1 1 of Fig. 2. Fig. 2 is a sectional plan view of the same on the line 2 2 of Fig. 1, and Fig. 3 is a plan view of the reed.

The apparatus is provided with a suitably-constructed casing A, in which is arranged a sounding-board B, supporting a comb C in the usual manner, said comb being provided with the usual teeth C', as is plainly shown in Figs. 1 and 2. The free end of each tooth C' is adapted to be engaged by the free end of a vibratory reed D, secured on a reed-casing D' and held over an opening E, leading to a wind-chest F, connected with a suitable suction-bellows of any approved construction. The opening E, leading to the reed D, is normally closed by a valve G, held in a closed position by a spring H and adapted to be pressed open by a key J under the control of the operator. The intermediate mechanism between the valve G and the key J consists of a rod I, connected with one end of the said valve G and extending to the outside of the wind-chest to connect with a lever I', carrying an arm I², adapted to be pressed upward by the inner end of the key J when the latter is played. Now it will be seen that when a key is pressed the valve G is opened, and the draft caused in the wind-chest F by the suction-bellows induces a vibration of the reed D, and as the free end of this reed during its vibration intermittently comes into contact with the free end of the tooth C' it is evident that the vibrations of the reed are transmitted to the tooth C', and consequently the latter is caused to vibrate and thereby produce the sound to which the tooth is tuned. Thus by playing the various keys J the desired music can be executed.

The free end of the vibratory reed is preferably felted, as at D², so as to prevent any harsh sounds by contact of the reed with the tooth C'. It is evident that by the arrangement described the harsh metallic sound produced by picking the teeth of the combs by star-wheels, pin-cylinders, and the like, as heretofore practiced, is completely obviated, and soft melodious tones are produced by the vibrating teeth of the comb.

Having thus fully described my invention, I claim as new and desire to secure by Letters Patent—

1. A musical instrument, comprising a comb, reeds or like vibrators adapted to engage the teeth of the comb, but independent thereof so as to be capable of alternately swinging into and out of contact with said teeth, and means for actuating the vibrators, substantially as described.

2. A musical instrument, comprising a comb, reeds or like vibrators provided with felted or cushioned portions arranged to intermittently engage the teeth of the comb and means for actuating the vibrators, substantially as described.

3. A musical instrument, comprising a comb, reeds or like vibrators whose free ends are arranged adjacent to the teeth of the comb so as to come into intermittent contact therewith during the vibration of the reeds, and means for actuating the vibrators, substantially as described.

4. A musical instrument, comprising a comb having teeth, and reeds adapted to be vibrated and adapted to engage with their free ends the free ends of the teeth, substantially as shown and described.

5. A musical instrument, comprising a comb, reeds or like vibrators arranged to intermittently engage the teeth of the comb, cushions located at the points of engagement of the teeth with the vibrators, and means for actuating the vibrators, substantially as described.

ALFRED HERRLING.

Witnesses:
THEO. G. HOSTER,
JNO. M. RITTER.